US012198598B2

United States Patent
(12)
Zhong et al.

(10) Patent No.: US 12,198,598 B2
(45) Date of Patent: Jan. 14, 2025

(54) METHOD AND DEVICE FOR BRIGHTNESS ADJUSTMENT OF DISPLAY PANEL, AND DISPLAY DEVICE

(71) Applicant: Xiamen Tianma Display Technology Co., Ltd., Xiamen (CN)

(72) Inventors: Chen Zhong, Xiamen (CN); Meng Lai, Xiamen (CN); Qiang Chen, Xiamen (CN); Jiajing Li, Xiamen (CN); Jingxiong Zhou, Xiamen (CN); Ying Sun, Xiamen (CN); Liujing Fan, Xiamen (CN); Zhiqiang Xia, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/195,206

(22) Filed: May 9, 2023

(65) Prior Publication Data

US 2024/0296774 A1 Sep. 5, 2024

(30) Foreign Application Priority Data

Mar. 2, 2023 (CN) ......................... 202310192922.6

(51) Int. Cl.
*G09G 3/20* (2006.01)

(52) U.S. Cl.
CPC ... *G09G 3/2074* (2013.01); *G09G 2320/0233* (2013.01); *G09G 2320/0626* (2013.01); *G09G 2340/00* (2013.01)

(58) Field of Classification Search
None
See application file for complete search history.

(56) References Cited

U.S. PATENT DOCUMENTS 11,626,086 B1 * 4/2023 Hei .......................... G09G 5/10 345/690

FOREIGN PATENT DOCUMENTS

CN 114299895 A 4/2022
CN 114639346 A * 6/2022

OTHER PUBLICATIONS

Translation of CN-114639346-A into English; Li et al. (Year: 2022).*

* cited by examiner

*Primary Examiner* — Brian M Butcher
(74) *Attorney, Agent, or Firm* — Anova Law Group, PLLC

(57) ABSTRACT

A brightness adjustment method and a brightness adjustment device of a display panel and a display device are provided. The brightness adjustment method of the display panel including a plurality of sub-pixels includes acquiring grayscale data received by the display panel; performing a data processing process on the grayscale data and at least inserting a plurality of transitional grayscales between a 0-order grayscale and a 1st-order grayscale to form target grayscale data; and adjusting the brightness of the plurality of sub-pixels based on the target grayscale data.

17 Claims, 12 Drawing Sheets

METHOD AND DEVICE FOR BRIGHTNESS ADJUSTMENT OF DISPLAY PANEL, AND DISPLAY DEVICE

CROSS-REFERENCE TO RELATED APPLICATION

This application claims the priority of Chinese Patent Application No. 202310192922.6, filed on Mar. 2, 2023, the content of which is incorporated by reference in its entirety.

TECHNICAL FIELD

The present disclosure generally relates to the field of display technologies and, more particularly, relates to a brightness adjustment method and a brightness adjustment device of a display panel and a display device.

BACKGROUND

With the continuous development of science and technology, various display devices have been widely used in people's life and work, which has brought great convenience to people's daily life. A display panel is one of the important components of a display device.

Organic light-emitting diodes (OLEDs), as a current-type of light-emitting devices, have been increasingly used in high-performance displays. Due to their self-luminous characteristics, compared with liquid crystal displays (LCDs), the OLED display technology has the advantages of high contrast, ultra-thin and bendable.

Mura is a common adverse phenomenon in the OLED display technology, which is mainly caused by the difference in characteristics of each TFT caused by the immature thin-film transistor (TFT) process. Demura is a compensation method for the Mura defects, which is divided into an internal compensation and an external compensation. The internal compensation adopts the characteristic difference of compensation pixel circuit to compensate the TFT. The external compensation detects the difference of each pixel through optical or electrical means and compensates it by changing the driving voltage.

However, the current display panel cannot effectively eliminate the Mura phenomenon when the display panel displays low order grayscale images. The present disclosed brightness adjustment methods and brightness adjustment devices of a display panel and display devices are direct to solve one or more problems set forth above and other problems in the arts.

SUMMARY

One aspect of the present disclosure provides a brightness adjustment method of a display panel. The brightness adjustment method of the display panel including a plurality of sub-pixels includes obtaining grayscale data received by the display panel; performing a data processing process on the grayscale data and at least inserting a plurality of transitional grayscales between a 0-order grayscale and a 1st-order grayscale to form target grayscale data; and adjusting the brightness of the plurality of sub-pixels based on the target grayscale data.

Another aspect of the present disclosure provides a brightness adjustment device of a display panel. The brightness adjustment device of a display panel including a plurality of sub-pixels includes an acquisition module, configured to acquire grayscale data received by the display panel; a data processing module, configured to perform a data processing process on the grayscale data and at least insert a plurality of transitional grayscales between a 0-order grayscale and a 1st-order grayscale to form target grayscale data; and a brightness adjustment module, configured to adjust the brightness of the plurality of sub-pixels based on the target grayscale data.

Another aspect of the present disclosure provides a display device. The display device includes a device for adjusting brightness of a display panel including a plurality of sub-pixels. The device for adjusting the brightness of the display panel included an acquisition module, configured to acquire grayscale data received by the display panel; a data processing module, configured to perform a data processing process on the grayscale data and at least insert a plurality of transitional grayscales between a 0-order grayscale and a 1st-order grayscale to form target grayscale data; and a brightness adjustment module, configured to adjust the brightness of the plurality of sub-pixels based on the target grayscale data.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings may also be obtained from these drawings without creative effort.

DETAILED DESCRIPTION

The following will clearly and completely describe the technical solutions in the embodiments of the present disclosure with reference to the accompanying drawings in the embodiments of the present disclosure. Obviously, the described embodiments are only some, not all, embodiments of the present disclosure. Based on the embodiments of the present disclosure, all other embodiments obtained by persons of ordinary skill in the art without making creative efforts belong to the protection scope of the present disclosure.

Figure 1:
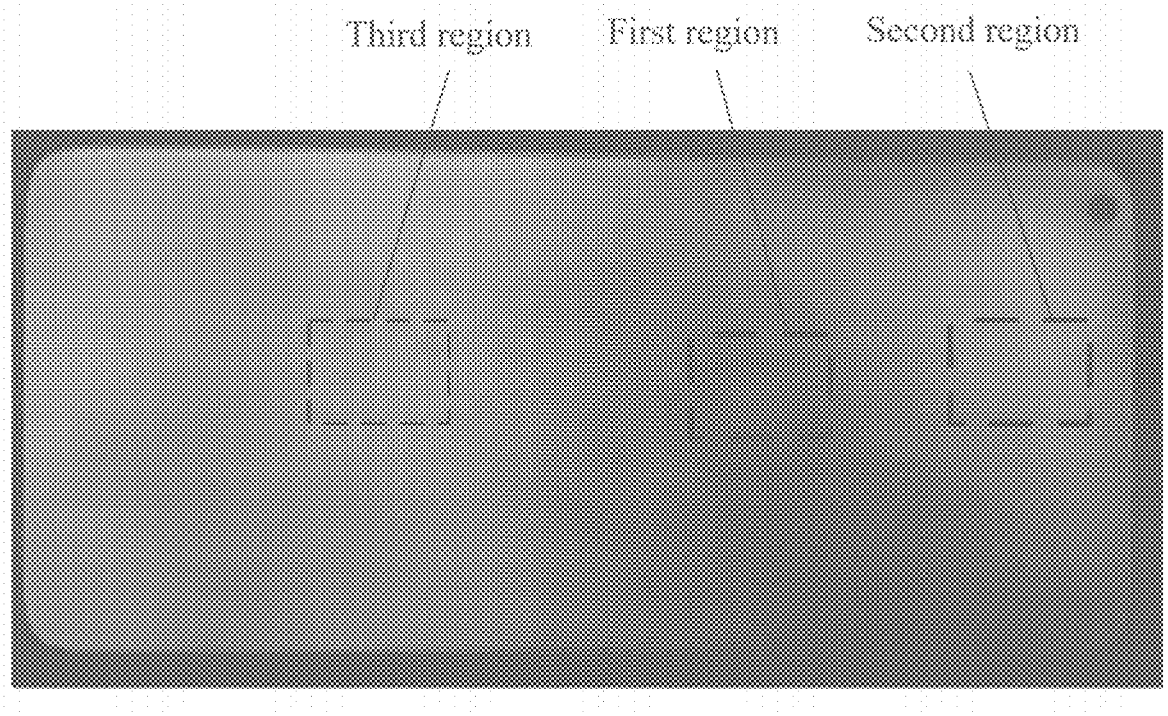
FIG. 1 illustrates a display effect of the display panel at a low order grayscale.
Figure 2:
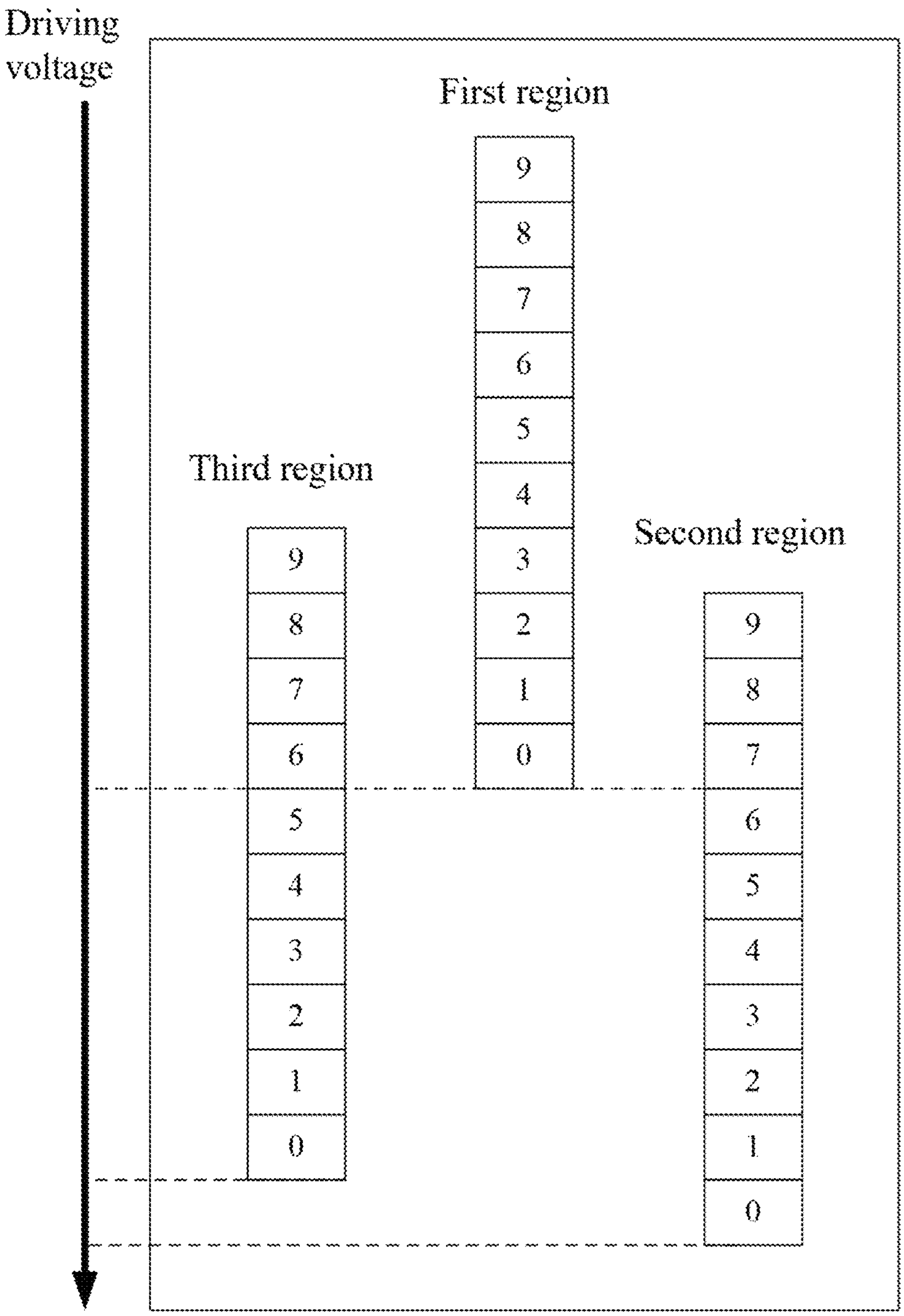
FIG. 2 illustrates the required voltage for each grayscale to compensate three areas to have uniform display brightness when the display panel in FIG. 1 is operated at the low order grayscale.

FIG. 1 is a schematic diagram of the display effect of the display panel at the low order grayscale. FIG. 2 illustrates the required voltages for compensating three areas of the display panel in FIG. 1 to have a uniform brightness at each grayscale when the display panel is displayed at the low order grayscale. The brightness of the first area in FIG. 1 is smaller than the brightness of the third area and is smaller than the brightness of the second area. For example, the first area, the second area and the third area in FIG. 1 show different luminance, which reflects that the Mura of the display panel is more serious when displaying at low order grayscales. It should be noted that the arrow in FIG. 2 points to the direction of increasing the driving voltage.

Because the 0-order grayscale display is a dark state display, after compensating the second area and the third area, as shown in FIG. 2, the grayscales below the 8-th order grayscale in the second area are all 0-order grayscale, and the grayscales below the 7-th order grayscale in the third area are also all 0-order grayscale. Thus, it is obvious to have the low order grayscale overcompensation. For example, after compensating the second area, there will be black spots in different degrees From the 1st-order grayscale to the 7-th order grayscale, and after compensating the third area, there will be black spots in different degrees From the 1st-order grayscale to the 6-th order grayscale. After compensating the second area and the third area, the grayscales that should have brightness will directly become the 0-order grayscale due to overcompensation.

In the existing technologies, to solve the above technical problem of overcompensation, the compensation data of the low order grayscale is usually reduced proportionally, or no compensation is made at the low order grayscale. Obviously, this technology will still lead to the low order grayscale display on the display panel, and severe Mura phenomenon still exists.

The present disclosure provides a method and a device for adjusting brightness of a display panel, and a display device, to ensure that the display panel may effectively perform a low order grayscale compensation.

To make the above objects, features and advantages of the present disclosure more comprehensible, the present disclosure will be further described in detail below in conjunction with the accompanying drawings and specific embodiments.

Figure 3:
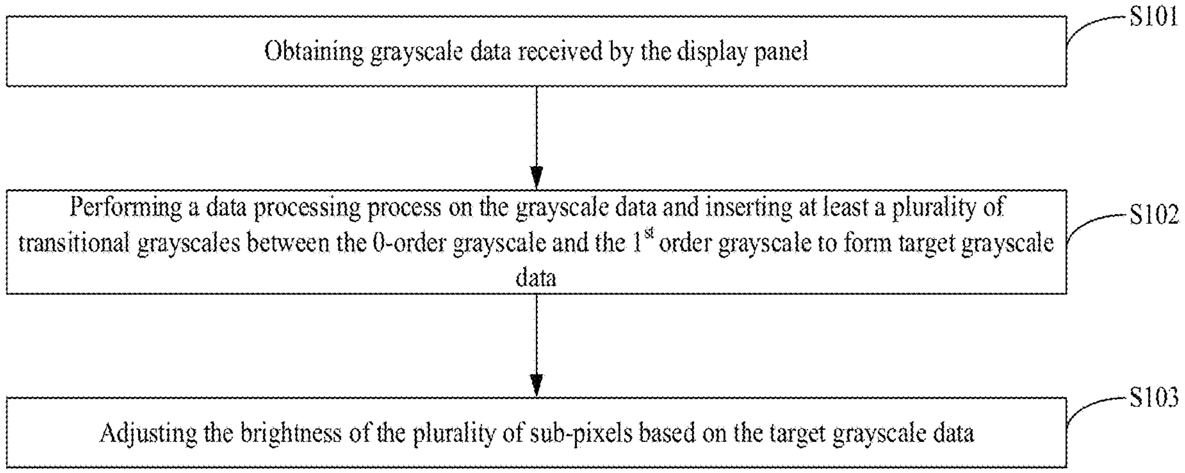
FIG. 3 illustrates a flow chart of an exemplary brightness adjustment method of a display panel according to various disclosed embodiments of the present disclosure.

FIG. 3 is a schematic flowchart of an exemplary method for adjusting brightness of a display panel provided by one embodiment of the present disclosure. The display panel may include a plurality of sub-pixels. As shown in FIG. 3, the method for adjusting the brightness of the display panel may include:

S101: acquiring grayscale data received by the display panel;

S102: performing a data processing process on the grayscale data and inserting at least a plurality of transitional grayscales between a 0-order grayscale and a 1st-order grayscale to form target grayscale data; and S103: adjusting the brightness of the plurality of sub-pixels based on the target grayscale data.

Specifically, in one embodiment of the present disclosure, due to the difference in the characteristics of TFTs and OLEDs in the design process of the display panel, to ensure that the brightness of the entire display panel under the 0-order grayscale display may be sufficiently low, the driving voltage corresponding to the 0-order grayscale may be reserved with the enough threshold voltage. For example, the measured dark-state voltage of the center point of the display panel is 5.7V, to ensure that the brightness of the entire display panel is displayed in a black state under the 0-order grayscale, the driving voltage corresponding to the 0-order grayscale may be set to be approximately 7V. That is, based on the dark state voltage of the central point of 5.7V, a threshold voltage of 0.5V and above may usually be reserved.

It should be noted that the above-mentioned settings of 5.7V, 7V and 0.5V are only described as examples, and are not limited in the embodiment of the present disclosure, and may be determined according to actual needs.

Referring FIG. 1 and FIG. 2, it may be assumed that the first area is the central area of the display panel, which may be already in the dark state display at this time, that is, whether the display panel is driven by 5.7V for the 0-order grayscale display or 7V for the 0-order grayscale display, the first region may always meet the requirement of the dark state display. That is, the driving voltage corresponding to the 0-order grayscale in the first region may be approximately 5.7V or 7V.

Then, to ensure that all areas of the entire display panel under the 0-order grayscale display may meet the requirement of the dark state display, it may be obviously necessary to drive the display panel with the driving voltage corresponding to the 0-order grayscale in the second area to perform the 0-order grayscale as shown in FIG. 2. The driving voltage corresponding to the 0-order grayscale in the second region may be the maximum driving voltage of the display panel, for example, the driving voltage corresponding to the 0-order grayscale in the second region may be approximately 7V.

In one embodiment of the present disclosure, the driving voltage corresponding to the 0-order grayscale in the grayscale data may be approximately 7V, and the driving voltage corresponding to the 0-order grayscale in the target grayscale data may also be approximately 7V. That is, the voltage corresponding to the 0-order gray scale in the grayscale data may be equal to the voltage corresponding to the 0-order grayscale in the target grayscale data. Such a configuration may ensure that all areas of the entire display panel under the 0-order grayscale display may meet the dark state display requirement.

Figure 4:
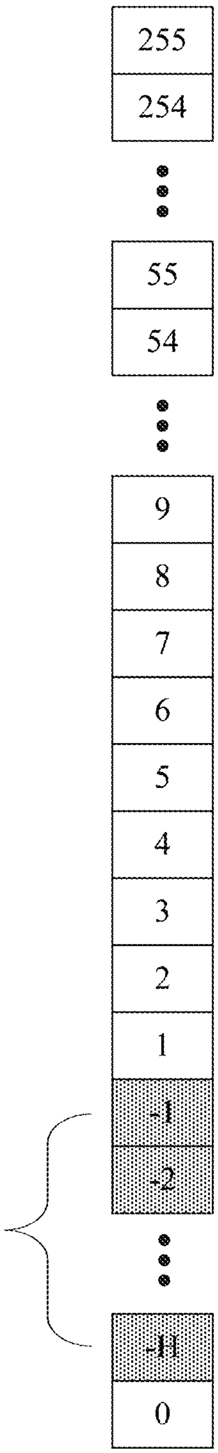
FIG. 4 illustrates an exemplary grayscale data after a data processing process according to various disclosed embodiments of the present disclosure.

Further, the display driver integrated circuit (DDIC) in the display panel may first obtain the received grayscale data, and the grayscale data may at least include the mapping data of the grayscale and the corresponding driving voltage. Based on the received grayscale data, a data processing process may be performed, and at least a plurality of transitional grayscales may be inserted between the 0-order grayscale and the 1st-order grayscale to form the target grayscale data. FIG. 4 illustrates a kind of grayscale data provided by one embodiment of the present disclosure after a data processing process. As shown in FIG. 4, at least the transitional grayscale of −1st-order, −2nd-order, . . . , −H-th-order may be inserted between the 0-order grayscale and the 1st-order grayscale. For example, the driving voltage corresponding to the 0-order grayscale may be approximately 7V, and the driving voltage corresponding to the 1st-order grayscale may be approximately 4.7V, then the driving voltages corresponding to the transitional grayscale of −1st-order, −2nd order, . . . , −H-th-order may be between approximately 4.7V-7V.

Figure 5:
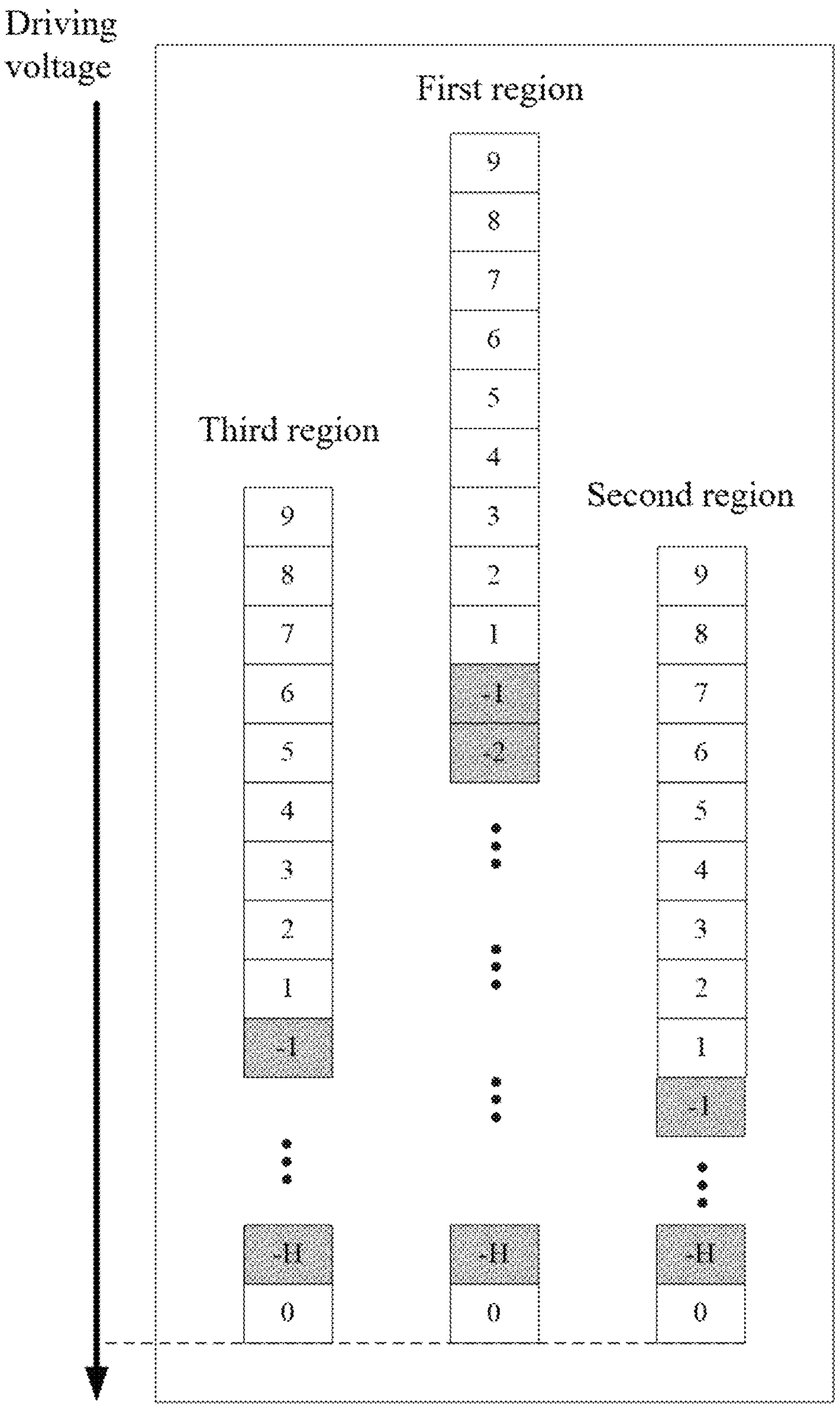
FIG. 5 illustrates an exemplary required voltage for each grayscale to compensate three areas to have uniform display brightness when the display panel in FIG. 1 is operated at the low order grayscale according to various disclosed embodiments of the present disclosure.

FIG. 5 illustrates a schematic diagram of the voltage values required for uniform brightness compensation in three regions for each grayscale level when the display panel in FIG. 1 is displaying at the low order grayscale according to various disclosed embodiments of the present disclosure. As shown in FIG. 5, the driving voltages for the 0-order grayscale display in the first region, the second region and the third region may be same, for example, approximately 7V.

Because in one embodiment of the present disclosure at least the transitional grayscales of −1st-order, −2nd-order, . . . , −H-th-order are inserted between the 0-order grayscale and the 1st-order grayscale, it may be obvious that based on the embodiment of the present disclosure, when performing the brightness compensation in the second region and the first region in FIG. 1, the brightness compensation for the second area and the third area may be realized comprehensively based on the original grayscale data and inserting the transitional grayscales, and it may not make some grayscales of the second area and the third area that should have the desired brightness directly become the 0-order grayscale due to overcompensation, and the compensation function for the 1st-order grayscale and the following order grayscale may be realized, which may effectively perform the low order grayscale compensation.

It should be noted that the number of transitional grayscales inserted between the 0-order grayscale and the 1st-order grayscale may not be limited in the present disclosure, and may be determined at least according to the actual display requirements of the display panel. For example, when the display panel requires a higher display quality, more transitional grayscales may be inserted between the 0-order grayscale and the 1st-order grayscale. If the display requirements of the display panel are average, fewer transitional gray scales may be inserted between the 0-order grayscale and the 1-st order grayscale.

The more the number of transitional grayscales inserted, the smaller the unit step value of the brightness compensation in a region will be, and the smaller the corresponding driving voltage difference between two adjacent transitional grayscales will be and the smaller the difference in display brightness between two adjacent transitional scales. Accordingly, a finer brightness compensation may be performed to meet the high display requirements of the display panel. Obviously, this may also increase computing and storage volume of the DDIC in the display panel.

Conversely, the less the number of transitional grayscales to insert, the larger the unit step value of the brightness compensation in each region will be, that is, the greater the difference between the corresponding driving voltages between two adjacent transitional grayscales will be, and the corresponding display brightness difference between two transitional grayscales will be larger. Obviously, the fineness of the brightness compensation may be relatively ordinary; and this may also reduce the calculation amount and storage amount of the DDIC in the display panel.

Therefore, the number of transitional grayscales inserted between the 0-order grayscale and the 1st-order grayscale may not be limited in the present disclosure, and may be determined at least according to the actual display requirements of the display panel.

Figure 6:
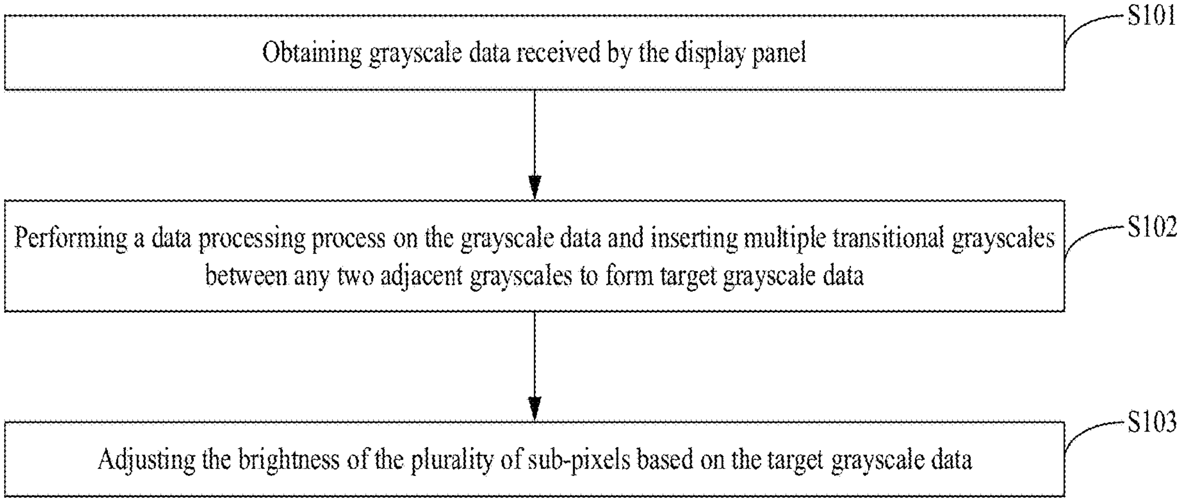
FIG. 6 illustrates a flow chart of another exemplary brightness adjustment method of a display panel according to various disclosed embodiments of the present disclosure.

FIG. 6 illustrates a schematic flowchart of another exemplary method for adjusting the brightness of a display panel according to various disclosed embodiments of the present disclosure. As shown in FIG. 6, in another embodiment of the present disclosure, in step S102, an exemplary implementation for performing the data processing process on the grayscale data and at least inserting a plurality of transitional grayscales between the 0-order grayscale and the 1st-order grayscale to form the target grayscale data may include S1021: performing a data processing process on the grayscale data, and inserting multiple transitional grayscales between two adjacent grayscales to form the target grayscale data.

For example, in one embodiment of the present disclosure, the grayscale data may include the 0-order grayscale to the 255-th-order grayscale. After the data processing process of the grayscale data is completed, beside the transitional grayscales inserted between the 0-order grayscale and the 1st-order grayscale described in the above embodiments, and multiple transitional grayscales may also be inserted between any other two adjacent grayscales to realize the expansion of the entire grayscale data, thereby improving the fineness of the brightness compensation of the display panel at any grayscale.

For example, when the display panel is lit with a set K-th-order grayscale, the actual brightness of some pixels in the display panel may be lower than the target brightness of the K-th-order grayscale, and at this time, it may be necessary to drive these pixels with a driving voltage corresponding to a higher order grayscale to display so that the actual brightness of these pixels may be same as the target brightness of the K-th-order grayscale. However, when these pixels are driven for displaying with the driving voltage corresponding to the (K+1)-th-order grayscale, the actual brightness of these pixels may be greater than the target brightness of the K-th-order grayscale. K may be greater than or equal to 0, and less than 254, and K may be a positive integer.

When the display panel is lit with the set K-th-order grayscale, the actual brightness of some pixels in the display panel may be lower than the target brightness of the K-th-order grayscale. When the display panel is lit with the (K+1)-th-order grayscale after the compensation, the actual brightness of these pixels in the display panel may be greater than the target brightness of the K-th-order grayscale. Because there is no transitional grayscale inserted between the K-th-order grayscale and the (K+1)-th-order grayscale in the existing technology, it may be impossible to accurately compensate for the brightness at this time.

However, in one embodiment of the present disclosure, a plurality of transitional grayscales may be inserted between two adjacent grayscales, and multiple transitional grayscales may be inserted between the K-th-order grayscale and the (K+1)-th-order grayscale. When the display panel is lit with the set K-th-order grayscale, the actual brightness of some pixels in the display panel may be less than the target brightness of the K-th-order grayscale, and when the display panel is lit with the (K+1)-th-order grayscale, the actual brightness of these pixels in the display panel may also be greater than the target brightness of the K-th-order grayscale.

Obviously, when the display panel is lit with a certain transitional grayscale among the multiple transitional grayscales inserted between the K-th-order grayscale and the (K+1)-th-order grayscale in the brightness compensation process, the actual brightness of these pixels may be same as the target brightness of the K-th-order grayscale, the brightness compensation of the display panel may be realized and the Mura phenomenon of the display panel may be solved.

Thus, in one embodiment of the present disclosure, the data processing process may be performed on the grayscale data, a plurality of transitional grayscales may be inserted between two adjacent grayscales to form the target grayscale data, and a better brightness compensation may be performed on the entire grayscale picture, and the overcompensation may be avoided.

Figure 7:
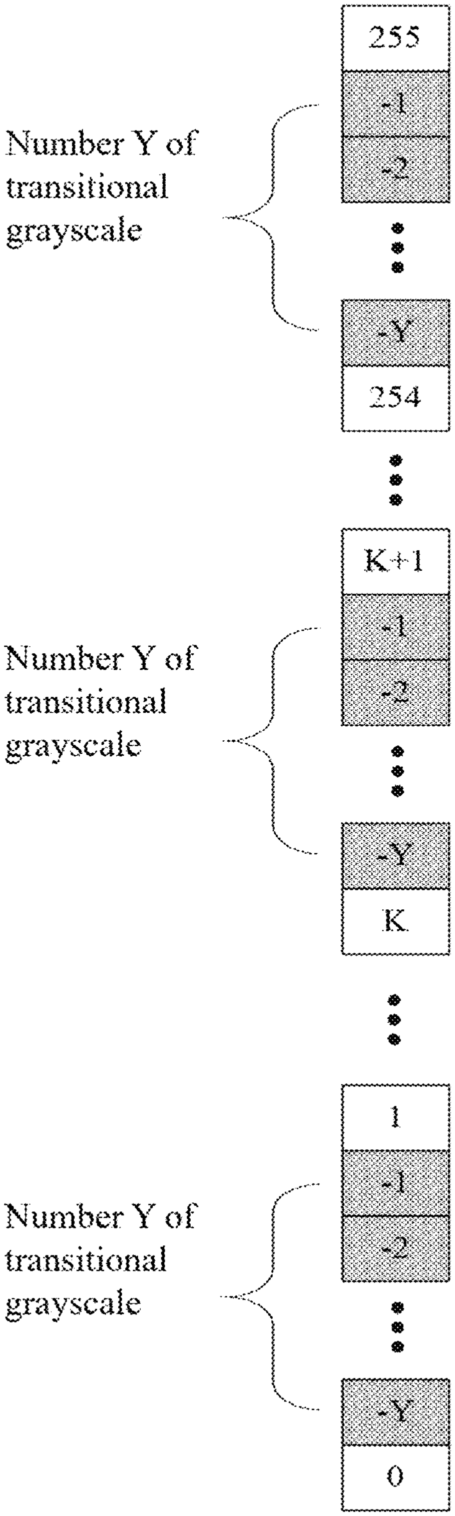
FIG. 7 illustrates another exemplary grayscale data after a data processing process according to various disclosed embodiments of the present disclosure.

FIG. 7 illustrates a schematic diagram of another exemplary grayscale data after the data processing process according to various disclosed embodiment of the present disclosure. As shown in FIG. 7, numbers of transitional grayscales inserted between any two adjacent grayscales may be equal. For example, as shown in FIG. 7, a number Y of transitional grayscales may be inserted between two adjacent grayscales.

Specifically, in one embodiment of the present disclosure, the grayscale data may include the 0-order grayscale to the 255-th-order grayscale. After the data processing process of the grayscale data is completed, a plurality of transitional grayscales may also be inserted between any two adjacent grayscales. The number of multiple transitional grayscales inserted between any two adjacent grayscales may be equal to realize the expansion of the entire grayscale data, thereby improving the fineness of the brightness compensation of the display panel at any grayscale, and ensuring that the display panel may perform effective brightness compensation under any grayscale display to improve the display effect of the display panel as a whole.

Figure 8:
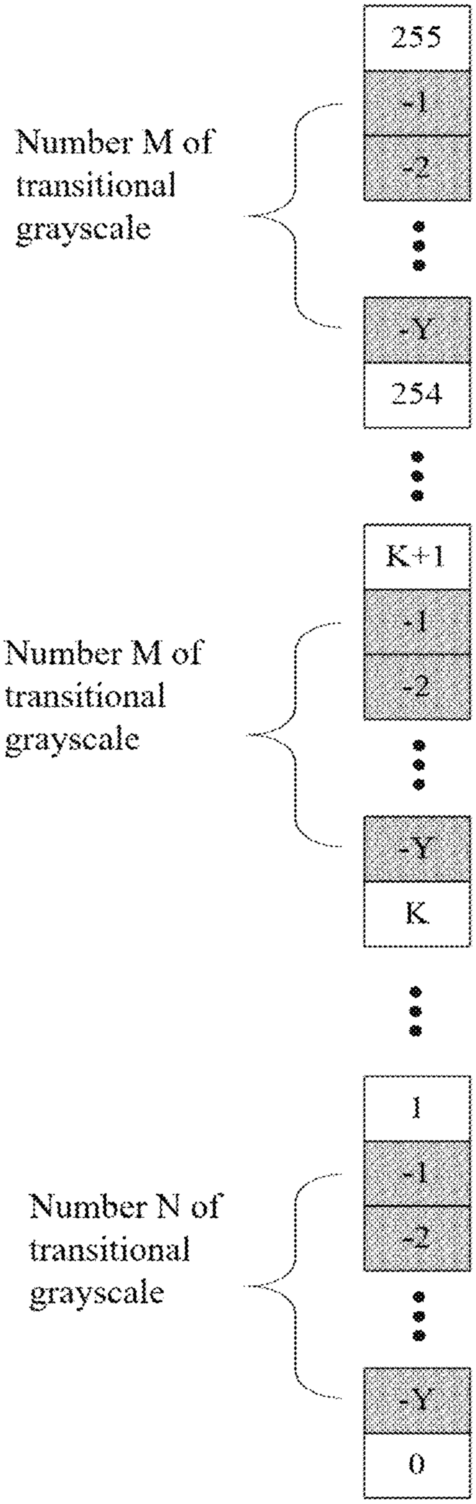
FIG. 8 illustrates another exemplary grayscale data after a data processing process according to various disclosed embodiments of the present disclosure.

FIG. 8 is a schematic diagram of another exemplary kind of grayscale data after the data processing process according to various disclosed embodiments of the present disclosure. As shown in FIG. 8, in some embodiments of the present disclosure, a number N of transitional grayscales may be inserted between the 0-order grayscale and the 1st-order gray level, and a number M of transitional grayscales may be inserted between any other adjacent two grayscales. N>M, and both N and M may be positive integers.

Specifically, in one embodiment of the present disclosure, because the 0-order grayscale may be a dark state, to avoid the phenomenon that some portions of the grayscales that should have a certain brightness directly become the 0-order grayscale due to overcompensation when the display panel is displaying at a low order grayscale, the number of transitional grayscales inserted between the 0-order grayscale and the 1st-order grayscale may be increased to provide enough compensation space below the 1st-order grayscale, and finally achieving the effective low order grayscale compensation and improving the display effect of the display panel.

It should be noted that in the above embodiment, numbers of transitional grayscales inserted between any other adjacent grayscales may be same, and the configuration that the number M of transitional grayscales are inserted is used as an example for illustration. In some embodiments, numbers of transitional grayscales inserted between any other adjacent grayscales may also be different, for example, the number of transitional grayscales inserted between the 1st-order grayscale and the 2nd-order grayscale 2 may be greater than the number of transitional grayscales inserted between the 2nd-order grayscale and the 3rd-order grayscale, and may also be less than the number of transitional grayscales inserted between the 2nd-order grayscale and the 3rd-order grayscale 3. In other embodiments, some adjacent grayscales may not be inserted with transitional grayscales.

In the embodiments of the present disclosure, the number of transitional grayscales inserted between adjacent grayscales may be determined based on the display characteristics of different display panels. The ultimate goal may be to ensure that the display panel may perform the effective brightness compensation display at any grayscale to improve the display effect of the display panel as a whole. On the basis of achieving such a goal, the amount of calculation and storage of the DDIC in the display panel may also be reduced, thereby reducing some unnecessary power consumption in the display panel.

In another embodiment of the present disclosure, performing the data processing process on the grayscale data may include converting the data length of the grayscale data from the first data length to a second data length. The second data length may be greater than the first data length.

Figure 9:
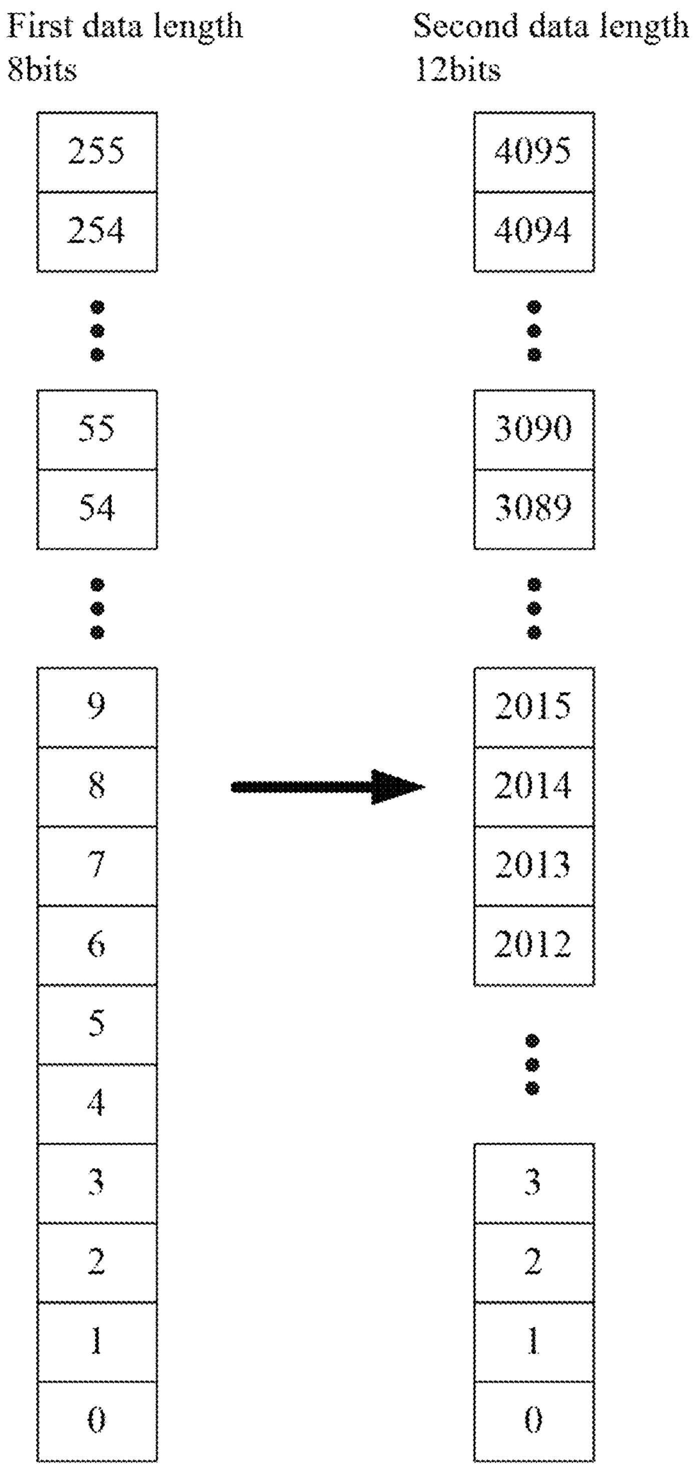
FIG. 9 illustrates another exemplary grayscale data after a data processing process according to various disclosed embodiments of the present disclosure.

In one embodiment of the present disclosure, the first data length may be in a range of approximately 8 bits-10 bits, and the second data length may be in a range of approximately 12 bits-16 bits. FIG. 9 illustrates a schematic diagram of performing a data processing process on the grayscale data. FIG. 9 uses the length of the first data being 8 bits and the length of the second data being 12 bits as an example.

Figure 10:
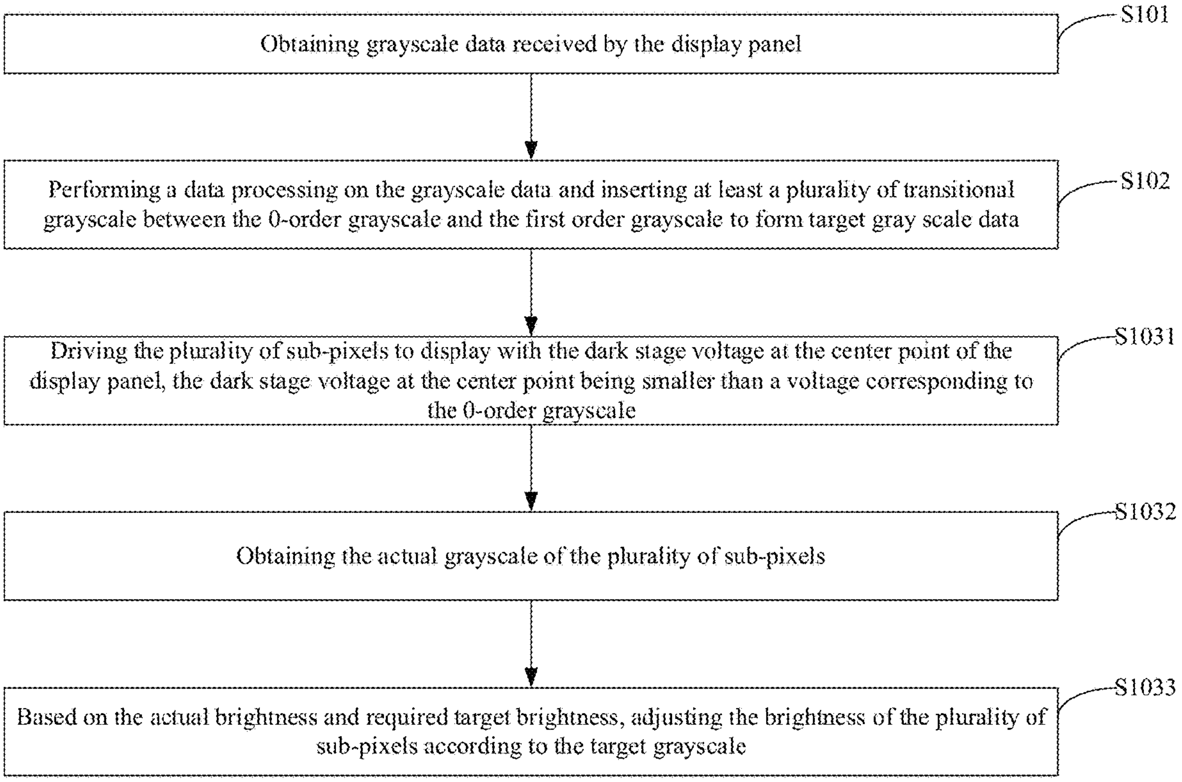
FIG. 10 illustrates a flow chart of another exemplary brightness adjustment method of a display panel according to various disclosed embodiments of the present disclosure.

FIG. 10 illustrates a schematic flowchart of another exemplary method for adjusting brightness of a display panel according to various disclosed embodiments of the present disclosure.

In step S103, an exemplary implementation of adjusting the brightness of the sub-pixels based on the target grayscale data may include:

S1031: driving the sub-pixels to display with a dark-state voltage at a center point of the display panel, wherein the dark-state voltage at the center point may be smaller than a voltage corresponding to the 0-order grayscale in the target grayscale data;

S1032: acquiring the actual brightness of the sub-pixels; and

S1033: adjusting the brightness of the plurality of sub-pixels according to the target grayscale data based on the actual brightness and the required target brightness.

Specifically, in one embodiment of the present disclosure, the sub-pixels may be driven to display with the dark-state voltage at the center point of the display panel, and then the actual brightness of the sub-pixels in the display panel may be obtained. When the actual brightness is greater than the required target brightness, the sub-pixels may be driven to display with the driving voltage corresponding to a lower order grayscale based on the target grayscale data. When the actual brightness is smaller than the required target brightness, the sub-pixels may be driven to display with the driving voltage corresponding to a higher order grayscale based on the target grayscale data. Accordingly, the display panel may perform the effective brightness compensation under any grayscale display to improve the display effect of the display panel as a whole.

Figure 11:
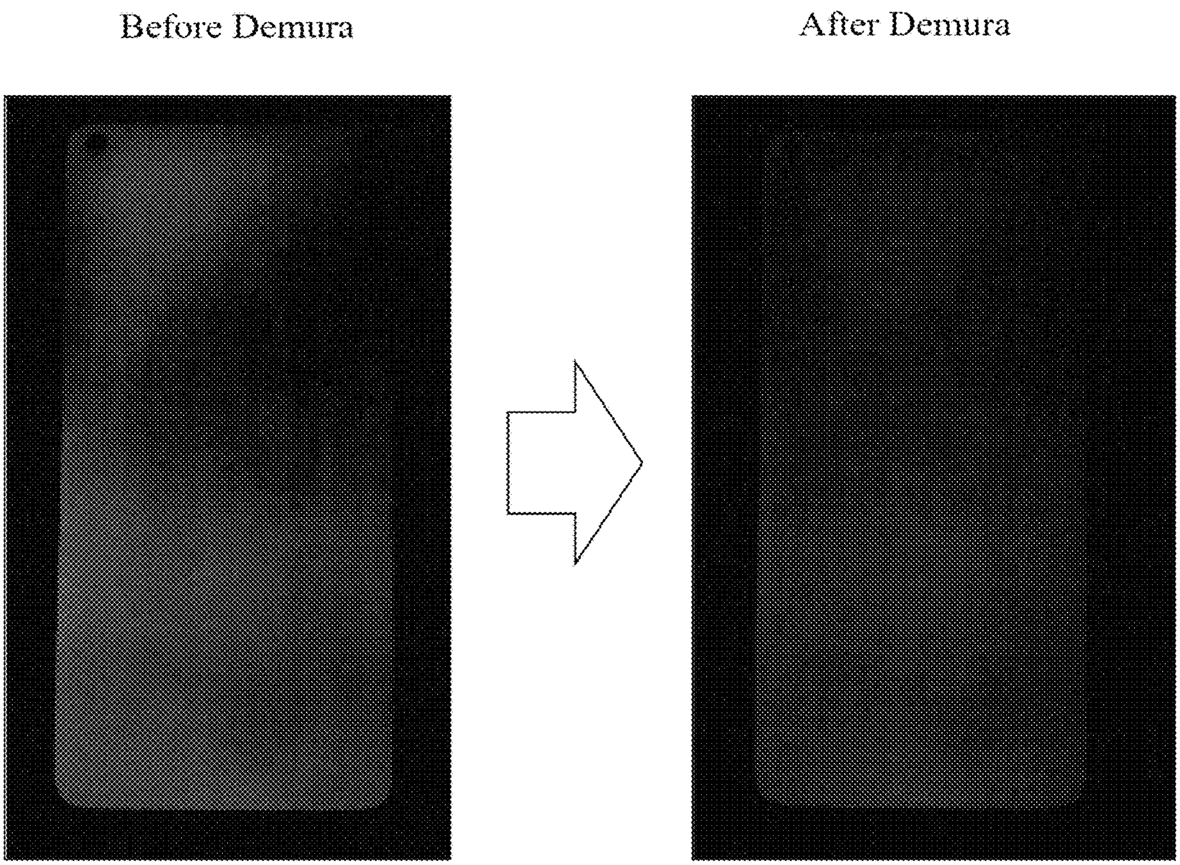
FIG. 11 illustrates an exemplary display effect before and after a low order grayscale compensation according to various disclosed embodiments of the present disclosure.

FIG. 11 is a schematic diagram of an exemplary display effect before and after the low order grayscale compensation according to various disclosed embodiments of the present disclosure. As shown in FIG. 11, the display effect of the display panel may be significantly improved by comparing before Demura and after Demura.

Figure 12:
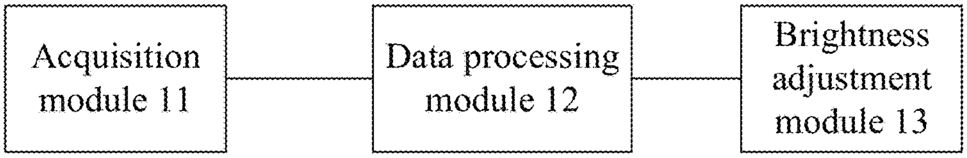
FIG. 12 illustrates a mechanism of an exemplary brightness adjustment device of a display panel according to various disclosed embodiments of the present disclosure.

The present disclosure also provides a device for adjusting brightness of a display panel. The device may be used to implement the method for adjusting brightness of a display panel in some of the foregoing embodiments. FIG. 12 is a schematic structural diagram of an exemplary brightness adjustment device of a display panel according to various disclosed embodiments of the present disclosure.

The display panel may include a plurality of sub-pixels, and the brightness adjustment device of the display panel may include an acquiring module 11 configured to acquire the grayscale data received by the display panel, a data processing module 12 configured to perform a data processing process on the grayscale data and insert at least a plurality of transitional grayscales between the 0-order grayscale and the 1st-order grayscale to form target grayscale data; and a brightness adjustment module 13 configured to adjust the brightness of the sub-pixels based on the target grayscale data.

Specifically, in one embodiment of the present disclosure, the data processing process may be performed based on the received grayscale data, and at least a plurality of transitional grayscales may be inserted between the 0-order grayscale and the 1st-order grayscale to form the target grayscale data to provide a sufficient compensation space below the 1st-order grayscale. Accordingly, when adjusting the brightness of the display panel, the brightness compensation may be realized comprehensively based on the original grayscale data and the inserted multiple transitional grayscale data. For example, to realize the brightness compensation function of the 1st-order grayscale and below such that the display panel may effectively perform the low order grayscale compensation.

In one embodiment of the present disclosure, the data processing module 12 may be specifically configured for performing the data processing process on the grayscale data, and a plurality of transitional grayscales may be inserted between two adjacent grayscales to form the target grayscale data.

In another embodiment of the present disclosure, numbers of multiple transitional grayscales inserted between any two adjacent grayscales may be equal.

In another embodiment of the present disclosure, a number N of transitional grayscales may be inserted between the 0-order grayscale and the 1st-order grayscale, and a number M of transitional grayscales may be inserted between any other adjacent two grayscales. N>M, and both N and M may be positive integers.

In another embodiment of the present disclosure, an exemplary implementation manner for the data processing module 12 to perform the data processing process on the grayscale data may include converting the data length of the grayscale data from the first data length to a second data length. The second data length may be greater than the first data length. In one embodiment of the present disclosure, the first data length may be 8 bits to 10 bits, and the second data length may be 12 bits to 16 bits.

In another embodiment of the present disclosure, the brightness adjustment module 13 may be configured to drive the sub-pixels to display with the dark-state voltage at the center point of the display panel. The dark-state voltage at the center point may be smaller than the voltage corresponding to the 0-order grayscale in the target grayscale data.

The brightness adjustment module 13 may also be configured to obtain the actual brightness of the sub-pixels and adjust the brightness of the sub-pixels based on the actual brightness and the required target brightness and according to the target grayscale data.

In another embodiment of the present disclosure, the voltage corresponding to the 0-order grayscale in the grayscale data may be equal to the voltage corresponding to the 0-order grayscale in the target grayscale data.

It should be noted that the principle of the brightness adjustment device for a display panel provided by the embodiment of the present disclosure may be same as the principle of the brightness adjustment method for a display panel provided by the above-mentioned embodiments of the present disclosure, and will not be repeated here.

Figure 13:
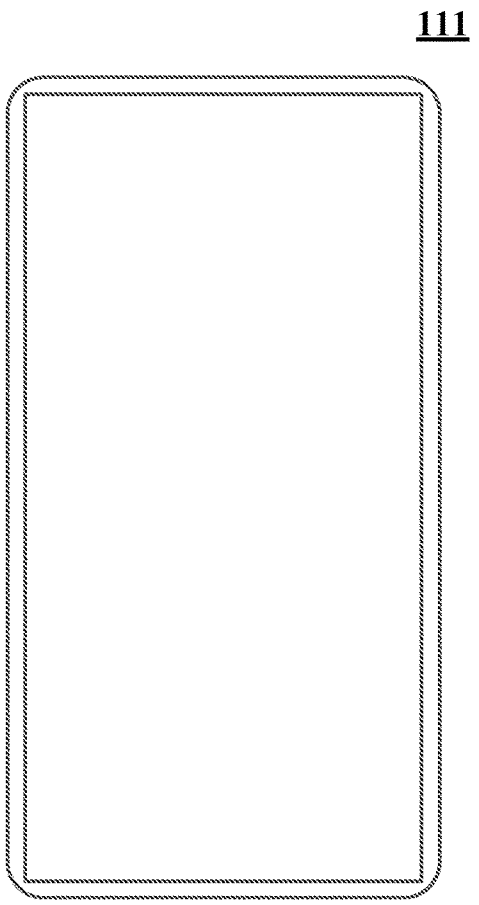
FIG. 13 illustrates an exemplary display device according to various disclosed embodiments of the present disclosure.

The present disclosure also provides a display device. FIG. 13 illustrates a schematic diagram of an exemplary display device according to various disclosed embodiments.

As shown in FIG. 13, the display device 111 may include the brightness adjustment device described in the above embodiments, or other appropriate brightness adjustment device.

Specifically, in one embodiment of the present disclosure, because the display device 111 provided by the embodiment of the present disclosure may include any brightness adjustment device provided by the above-mentioned embodiments, the display device 111 may include the technical effects same or corresponding to the technical effects of the brightness adjustment device provided by the above-mentioned embodiments. The display device 111 may be a mobile phone, a computer, or other electronic devices.

In another embodiment of the present disclosure, the display device 111 may include a computer-readable storage medium. Computer-executable instructions may be stored in the computer-readable storage medium, and the computer-executable instructions may be used to execute the above-mentioned brightness adjustment method provided in the embodiments.

Figure 14:
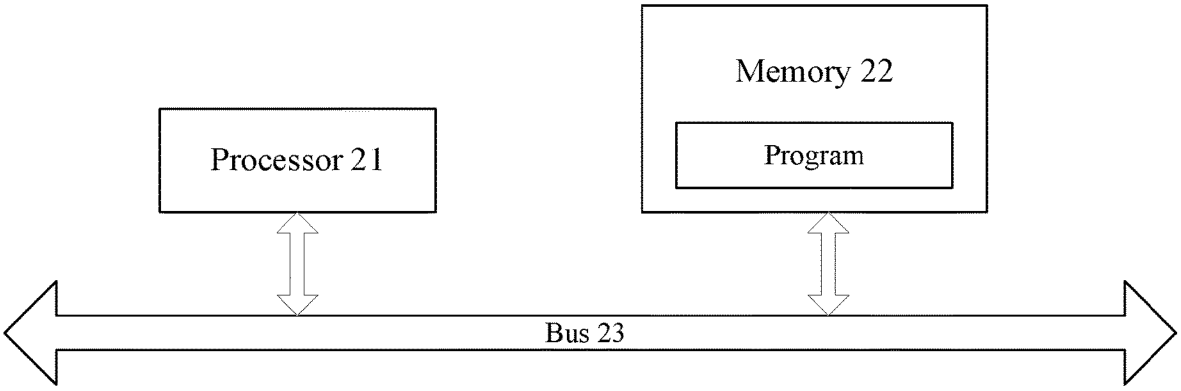
FIG. 14 illustrates a hardware framework of an exemplary display device according to various disclosed embodiments of the present disclosure.

FIG. 14 is a schematic diagram of an exemplary hardware architecture of a display device according to various disclosed embodiments of the present disclosure. As shown in FIG. 14, in one embodiment of the present disclosure, the display device 111 may include at least one processor 21, and at least one memory 22 and a bus 23 connected to the processor 21.

The processor 21 and the memory 22 may communicate with each other through the bus 23. The processor 21 may be configured to call the program instructions in the memory 22 to execute the brightness adjustment method provided by the above-mentioned embodiments.

The beneficial effects realized by the present disclosure may include the following.

The present disclosure provides a brightness adjustment method and a brightness adjustment device of a display panel, and a display device. The brightness adjustment method may perform a data processing process on the received grayscale data, and at least insert a plurality of transitional grayscales between the 0-order grayscale and the 1st-order grayscale to provide enough compensation space below the 1st-order grayscale. Thus, when adjusting the brightness of the display panel, the brightness compensation may be realized comprehensively based on the original grayscale data and the multiple inserted grayscale data, that is, to realize the function of performing brightness compensation further down from the 1st-order grayscale down. Thus, the display panel may effectively perform the low order grayscale compensation.

The method and device for adjusting the brightness of a display panel and the display device provided by the present disclosure have been described in detail above. In this disclosure, specific examples are used to illustrate the principle and implementation of the present disclosure. The description of the above embodiments is only for helping to understand the method of the present disclosure and its core idea; at the same time, for those of ordinary skill in the art, according to the idea of the present disclosure, there will be changes in the specific implementation and scope of application. In summary, the content of this specification should not be construed as a limitation of the disclosure.

It should be noted that each embodiment in this specification is described in a progressive manner, and each embodiment focuses on the differences from other embodiments.

The same and similar parts in each embodiment may refer to each other. As for the device disclosed in the embodiment, because it corresponds to the method disclosed in the embodiment, the description is relatively simple, the related part may be referred to the description of the method part.

It should also be noted that in this article, relational terms, such as first and second etc., are only used to distinguish one entity or operation from another entity or operation, and do not necessarily require or imply that these entities or operations have such actual relationship or order exists between. Furthermore, the term "comprises", "include" or any other variation thereof is intended to encompass a non-exclusive inclusion such that elements inherent in a process, method, article, or apparatus comprising a set of elements are included or are also included as such, method, article or device inherent in the elements. Without further limitations, an element defined by the phrase "comprising a . . . " does not exclude the presence of additional identical elements in the process, method, article or apparatus comprising said element.

The above description of the disclosed embodiments is provided to enable any person skilled in the art to make or use the disclosure. Various modifications to these embodiments will be readily apparent to those skilled in the art, and the general principles defined herein may be implemented in other embodiments without departing from the spirit or scope of the disclosure. Therefore, the present disclosure will not be limited to the embodiments shown herein, but is to be accorded the widest scope consistent with the principles and novel features disclosed herein.

What is claimed is:

1. A method for adjusting brightness of a display panel including a plurality of sub-pixels, comprising:

acquiring grayscale data received by the display panel;

performing a data processing process on the grayscale data and at least inserting a plurality of transitional grayscales between a 0-order grayscale and a 1st-order grayscale to form target grayscale data, wherein performing the data processing process on the grayscale data comprises converting a data length of the grayscale data from a first data length to a second data length, wherein the second data length is greater than the first data length; and adjusting the brightness of the plurality of sub-pixels based on the target grayscale data and at least a sub-pixel other than the plurality of sub-pixels with only the acquired grayscale data.

2. The method according to claim 1, wherein performing the data processing process on the grayscale data and at least inserting the plurality of transitional grayscales between the 0-order grayscale and the 1st-order grayscale to form the target grayscale data comprises:

performing the data processing process on the grayscale data and inserting multiple transitional grayscales between any two adjacent grayscales to form the target grayscale data.

3. The method according to claim 2, wherein:

numbers of the multiple transitional grayscales inserted between any two adjacent grayscales are same.

4. The method according to claim 2, wherein:

a number N of transitional grayscales are inserted between the 0-order grayscale and the 1st-order grayscale;

a number M of transitional grayscales are inserted between any other two adjacent grayscales; and $N>M$, and N and M are both positive integers.

5. The method according to claim 1, wherein:

the first data length is in a range of approximately 8 bits-10 bits; and the second data length is in a range of approximately 12 bits-16 bits.

6. The method according to claim 1, wherein adjusting the brightness of the plurality of sub-pixels based on the target grayscale data comprises:

driving the plurality of sub-pixels to display with a dark state voltage at a center point of the display panel, the dark state voltage at the center point being smaller than a voltage corresponding to the 0-order grayscale in the target grayscale data;

acquiring an actual brightness of the plurality of sub-pixels; and based on the actual brightness and a required target brightness, adjusting the brightness of the plurality of sub-pixels according to the target grayscale data and at least a sub-pixel other than the plurality of sub-pixels with only the acquired grayscale data.

7. The method according to claim 1, wherein:

a voltage corresponding to the 0-order grayscale in the grayscale data is equal to a voltage corresponding to the 0-order grayscale in the target grayscale data.

8. A device for adjusting brightness of a display panel including a plurality of sub-pixels, comprising:

an acquisition module, configured to acquire grayscale data received by the display panel;

a data processing module, configured to perform a data processing process on the grayscale data and at least insert a plurality of transitional grayscales between a 0-order grayscale and a 1st-order grayscale to form target grayscale data, wherein the data processing module is further configured to convert a data length of the grayscale data from a first data length to a second data length when performing the data processing process on the grayscale data, wherein the second data length is greater than the first data length; and a brightness adjustment module, configured to adjust the brightness of the plurality of sub-pixels based on the target grayscale data and at least a sub-pixel other than the plurality of sub-pixels with only the acquired grayscale data.

9. The device according to claim 8, wherein:

the data process module is configured to perform the data processing process on the grayscale data, and insert multiple transitional grayscales between any two adjacent grayscales to form the target grayscale data.

10. The device according to claim 9, wherein:

numbers of the multiple transitional grayscales inserted between the any two adjacent grayscales are same.

11. The device according to claim 9, wherein:

a number N of transitional grayscales are inserted between the 0-order grayscale and the 1st-order grayscale;

a number M of transitional grayscales are inserted between any other two adjacent grayscales; and N>M, and N and M are both positive integers.

12. The device according to claim 8, wherein:

the first data length is in a range of approximately 8 bits-10 bits; and the second data length is in a range of approximately 12 bits-16 bits.

13. The device according to claim 8, wherein:

the brightness adjustment module is configured to drive the plurality of sub-pixels to display with a dark state voltage at a center point of the display panel, the dark state voltage at the center point being smaller than a voltage corresponding to the 0-order grayscale in the target grayscale data, acquire an actual brightness of the plurality of sub-pixels, and based on the actual brightness and the required target brightness, adjusting the brightness of the plurality of sub-pixels according to the target grayscale data and at least a sub-pixel other than the plurality of sub-pixels with only the acquired grayscale data.

14. The device according to claim 8, wherein:

a voltage corresponding to the 0-order grayscale in the grayscale data is equal to a voltage corresponding to the 0-order grayscale data in the target grayscale data.

15. A display device, comprising:

a device for adjusting brightness of a display panel including a plurality of sub-pixels, including an acquisition module, configured to acquire grayscale data received by the display panel; a data processing module, configured to perform a data processing process on the grayscale data and at least insert a plurality of transitional grayscales between a 0-order grayscale and a 1st-order grayscale to form target grayscale data and a brightness adjustment module, configured to adjust the brightness of the plurality of sub-pixels based on the target grayscale data and at least a sub-pixel other than the plurality of sub-pixels with only the acquired grayscale data, wherein the data processing module is further configured to convert a data length of the grayscale data from a first data length to a second data length when performing the data processing process on the grayscale data, wherein the second data length is greater than the first data length.

16. The display device according to claim 15, comprising:

a computer-readable storage medium, wherein computer-executable instructions are stored in the computer-readable storage medium; and the computer-executable instructions are configured to execute a brightness adjustment method including obtaining grayscale data received by the display panel; performing a data processing process on the grayscale data and at least inserting a plurality of transitional grayscales between the 0-order grayscale and the 1st-order grayscale to form target grayscale data; and adjusting the brightness of the plurality of sub-pixels based on the target grayscale data and at least a sub-pixel other than the plurality of sub-pixels with only the acquired grayscale data.

17. The display device according to claim 15, comprising:

at least one processor; and at least a memory and a bus connected to the at least one processor, wherein:

the at least one processor and the memory realize a mutual communication through the bus; and the at least one processor is configured to call program instructions in the memory to execute the brightness adjustment method.

* * * * *